United States Patent [19]

Kato et al.

[11] Patent Number: 4,868,275

[45] Date of Patent: Sep. 19, 1989

[54] PREPARATION OF POLY (ARYLENE SULFIDE) FROM DIHALO AROMATIC HYDROXYL COMPOUND

[75] Inventors: Toshikazu Kato; Hiroshi Inoue; Satoshi Tomagou; Noriaki Emura, all of Mie, Japan

[73] Assignee: Tosoh Corporation, Tokyo, Japan

[21] Appl. No.: 234,046

[22] Filed: Aug. 19, 1988

[30] Foreign Application Priority Data

Aug. 19, 1987 [JP] Japan .................................. 62-204174

[51] Int. Cl.$^4$ ..................... C08G 75/16; C08G 83/00
[52] U.S. Cl. ................................... 528/212; 528/125; 528/128; 528/214; 528/388
[58] Field of Search ............... 528/212, 388, 125, 128, 528/214

[56] References Cited

U.S. PATENT DOCUMENTS

| | | | |
|---|---|---|---|
| 3,354,129 | 11/1967 | Edmonds et al. ..................... | 260/79 |
| 3,647,885 | 3/1972 | Geering et al. ..................... | 528/212 |
| 3,668,258 | 6/1972 | Hageman ............................ | 528/212 |
| 3,763,124 | 10/1973 | Edmonds ............................ | 260/79.1 |
| 4,405,767 | 9/1983 | Beever et al. ..................... | 525/537 |

FOREIGN PATENT DOCUMENTS 1443325  5/1966  France .

*Primary Examiner*—Harold D. Anderson
*Attorney, Agent, or Firm*—Sughrue, Mion, Zinn, Macpeak & Seas

[57] ABSTRACT

In a process in which a poly (arylene sulfide) is synthesized by reacting a dihaloaromatic compound and an alkali metal sulfide in a polar organic solvent, the curing ability of the product polymer is significantly enhanced by introducing a small proportion of a hydroxyl group-containing polyhaloaromatic compound to the reaction mixture when a conversion of at least 60% has been achieved with respect to the dihaloaromatic compound present in the reaction mixture. The product polymer may be advantageously employed in various molding, forming or coating processes to provide the produced articles with increased strengths. The hydroxyl groups introduced into the polymer enable the polymer to be modified, if desired.

16 Claims, No Drawings

PREPARATION OF POLY (ARYLENE SULFIDE) FROM DIHALO AROMATIC HYDROXYL COMPOUND

This invention relates to a process for preparing improved poly (arylene sulfide) resins which exhibit an ability to cure at an increased rate and form products with excellent strength properties. The poly (arylene sulfide) materials according to the present process may be used in applications as thermoset resins because of their enhanced curing ability.

Since the product poly (arylene sulfide) according to the present invention carries hydroxyl groups, it is possible to modify the polymer by utilizing the hydroxyl groups for reaction with an appropriate modifier or modifiers.

Poly (arylene sulfide) materials, a typical example of which is poly (phenylene sulfide), exhibit excellent heat and chemical resistance properties and, hence, have attracted a good deal of attention as materials useful for producing articles such as parts in electrical and electronic instruments and automotive parts, and as material for coating substrates, in particular metallic substrates. Poly (arylene sulfide) materials may be formed or molded, for example by injection molding or extrusion molding techniques into various articles, such as moldings, films, sheets, fibers, filaments, etc. These products have been used in fields where high heat and chemical resistance properties are required.

A method of production of poly (arylene sulfide) is disclosed in Japanese Patent Publication (KOKOKU) No. 45-3368, which method comprises reacting a dihaloaromatic compound with an alkali metal sulfide in a polar organic solvent such as N-methyl pyrrolidone. Generally, the polymers prepared by this method exhibit low melt viscosities. Although the polymers as produced may be used in a dispersion for coating applications, they can be used in molding or forming applications, such as injection molding, only with difficulty, due to their low melt viscosities. In order to reduce this low melt viscosity problem, it has been proposed to subject the polymer to thermal oxidation crosslinking (or curing) treatment so as to increase the melt viscosity before the polymer is used in molding or forming applications. However, since this crosslinking treatment permits the polymer to increase its melt viscosity only at a low rate (or provides the polymer with only a poor curing ability), it has been required that the treatment should be conducted at a raised temperature for an extended period of time in order to obtain levels of increased melt viscosity suitable for use in appropriate applications, for example, injection molding, extrusion molding, or coating of metals in the fluidized bed method. Therefore, the treatment suffers from disadvantages of low throughput and expensive operating costs. Further, generally, the moldings or other products formed from the thus treated polymers do not exhibit a desirably high level of mechanical strength.

Japanese Patent Application Public Disclosure (KOKAI) No. 59-6221 describes a method for enhancing the curing ability of poly (arylene sulfide), which method, comprising reacting a poly (arylene sulfide) with an alkali metal sulfide and a polyhaloaromatic compound having more than 2 halogen atoms in an N-alkyl lactam at a raised temperature. The poly (arylene sulfide) material fed to this method is an isolated and purified product from the preceding poly (arylene sulfide) synthesis process. The purified product is reacted with the polyhaloaromatic compound and alkali metal sulfide in the N-alkyl lactam medium at a high temperature. In fact, the method requires that a considerable number of steps should be involved therein. Therefore, the method would present a serious problem of increased operating costs, if operated in a commercial practice.

We have concentrated our effort to solve or substantially obviate the problems encountered with the prior art techniques.

Accordingly the present invention provides a process for preparing an improved poly (arylene sulfide) resin that exhibits an ability to cure at an increased rate and forms products with excellent strength properties.

The present invention provides also poly (arylene sulfide) materials that can be used in thermosetting applications.

The invention provides also hydroxyl group-containing poly (arylene sulfide) materials that can be modified by virtue of the presence of the hydroxyl groups on the polymeric backbone chains.

Thus, the present invention comprises a process of the production of a poly (arylene sulfide) comprising reacting a dihaloaromatic compound with an alkali metal sulfide in a polar organic solvent wherein when a conversion of at least 60% of the dihaloaromatic compound has been achieved, a hydroxyl group-containing polyhaloaromatic compound is added to the reaction mixture in a proportion of from 0.05 to 10 mol % with respect to the alkali metal sulfide and then the reaction is allowed to further continue.

The product poly (arylene sulfide) will raise its melt viscosity property at an increased rate when cured.

Thus, the curing time required for achieving a given level of increased melt viscosity will be significantly reduced. It is possible to produce, from the poly (arylene sulfide) materials of the present invention, articles having increased strength properties.

The invention will be described in more detail:

Examples of the dihaloaromatic compounds which may be employed in the invention include o-, m- and p-dichlolobenzenes; p-dibromo- and p-di-iodo-benzenes; dichloro- and dibromo-haphthalenes; dichlorodiphenyl sulfone, dichlorobenzophenone, dichlorodiphenyl ether, dichlorodiphenyl sulfide, dichloro- and dibromo-diphenyls, dichlorodiphenyl sulfoxide and mixtures thereof. Usually, p-dichlorobenzene is employed.

Provided that the linearity of the polymer is not significantly disturbed, a minor proportion of other polyhaloaromatic compounds, for example, trichlorobenzenes, triboromobenzenes, tri-iodobenzenes, tetrachlorobenzenes, trichloronaphthalenes, tetrachloronaphthalenes, etc. may be used in addition to the dihaloaromatic component in the process.

Examples of the alkali metal sulfides which may be used in the invention include sulfides of lithium, sodium, potassium, rubidium and cesium and mixtures thereof. The alkali metal sulfide may be prepared by reacting an alkali metal hydrosulfide with an alkali metal base or reacting hydrogen sulfide with an alkali metal base. In the present process, the alkali metal sulfide may be formed in situ prior to introduction of the dihaloaromatic compound and the hydroxyl group-containing polyhaloaromatic compound into the reaction system. Of course, the sulfide may be prepared outside the reaction system and then introduced to the system. Of the above-listed alkali metal sulfides, sodium sulfide is preferably used in the process.

Although, normally the alkali metal sulfides contain hydration water, it is preferred that the water content in the reaction system should be in the range of from 0.5 to 10 moles per mole of the alkali metal sulfide present. The water content may be controlled to a desired level, if necessary, during the process.

The relative proportions of the dihaloaromatic compound and the alkali metal sulfide used in the process are usually in the range of 0.85 to 1.1 moles of dihaloaromatic compound per mole of alkali metal sulfide.

The organic polar solvent used in the invention is preferably an aprotic solvent which is stable at high temperatures. Examples of solvents which may be mentioned include amides and ureas, such as N,N-dimethyl acetamide, N-ethyl-2-pyrrolidone, N-methyl-2-pyrrolidone, hexamethylphosphoramide, tetramethyl urea and 1,3-dimethyl-2-imidazolidinone; sulfolanes, such as sulfolane itself and dimethyl sulfolane; and ketones such as methyl phenyl ketone; and mixtures thereof.

The quantity of the organic polar solvent used in the process should be in the range of from 1 to 10 moles per each mole of the alkali metal sulfide. If the solvent is used at a level of less than 1 mole on the same basis, an unacceptably low yield of the polymer will be obtained and the curing ability of the product polymer will not be significantly enhanced. On the other hand, employment of the solvent in an amount of more than 10 moles on the same basis is generally undesirable from the viewpoint of economy.

Examples of the hydroxyl group-containing polyhaloaromatic compounds which may be used in the invention include 2,3-, 2,4-, 2,5-, 2,6-, 3,4- and 3,5-dichlorophenols; 2,4,5- 2,4,6- and 3,4,5-trichlorophenols; 2,4,6-tribromophenol, 1,3-dihydroxy-4,6-dichlorobenzene, 2,4-dichloro-1-naphthol, 2,4-dichloro-6-methylphenol, etc. and mixtures thereof.

The amount of the hydroxyl group-containing polyhaloaromatic compound used in the process is in the range of from 0.05 to 10 mol %, preferably from 0.1 to 5 mol %, with respect to the alkali metal sulfide present. Employment of the compound in a proportion of less than 0.05 mol % on the same basis will result in a poly (arylene sulfide) product having a poor curing ability, while employment of the compound in a proportion of more than 10 mol % will give rise to a polymer product of an unacceptably low resistance to heat.

The time at which the hydroxyl group-containing polyhaloaromatic compound is introduced to the reaction system should be after the dihaloaromatic compound has been converted to an extent of at least 60%. Should the hydroxypolyhaloaromatic compound be added into the system before the conversion of the dihaloaromatic compound reaches a level of 60%, then a poor curing ability of the product polymer and low strength properties of articles derived from the polymer will result.

The term "conversion % of dihaloaromatic compound" used herein represents a value calculated according to the following equation:

Conversion (%) = 100 − $\left[ \dfrac{\text{unreacted } DHAr \text{ (moles)} - \text{excess } DHAr \text{ (moles)}}{\text{charged } DHAr \text{ (moles)}} \right] \times 100$ wherein,
DHAr represents a dihaloaromatic compound and "excess DHAr" represents a stoichiometrically excess amount of DHAr with respect to the alkali metal sulfide where the former is charged in excess of the latter.

In the process of the invention, if desired, an auxiliary agent such as an organic alkali metal carboxylate or a lithium halide may be added to form a polymeric product of greater molecular weight.

The present process is effected with stirring at a temperature in the rang of 180° C. to 300° C., preferably 200° C. to 270° C., for period of from 0.5 to 20 hours. Use of reaction temperatures lower than about 180° C. leads to an unacceptably low reaction rate. When the reaction temperature is higher than about 300° C., the product polymer tends to degrade.

The poly (arylene sulfide) product may be recovered from the resulting reaction mixture by any conventional technique. For example, the solvent may be separated from the reaction mixture by distillation or flashing, to leave the polymeric product which is then washed and recovered. Alternatively, the resulting reaction mixture may be cooled and filtered to separate the polymeric product from the solvent and then the separated polymer may be washed and recovered.

A typical example of the poly (arylene sulfide) materials produced according to the present process is a poly (phenylene sulfide) resin in which the repeating unit

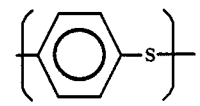

comprises 80 mol % or more of the total repeating units in the polymeric backbone. Other examples include:

poly (phenylene sulfide sulfone)

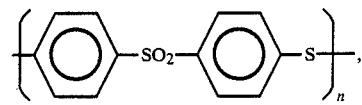

poly (phenylene sulfide ketone)

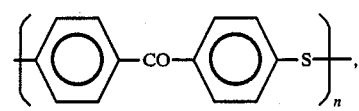

poly (phenylene sulfide ether)

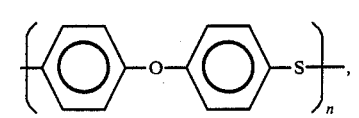

poly (diphenylene sulfide)

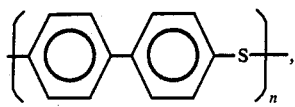

and copolymers containing 2 or more of the above-listed repeating units.

The poly (arylene sulfide) materials, either in thermally treated or untreated states, may be mixed with any additives before use, for example, reinforcing fillers, such as ceramic fibers (e.g., glass, carbon or alumina fibers), aramide fibers, wholly aromatic polyester fibers, metallic fibers and whiskers (e.g. of potassium titanate); inorganic fillers such as calcium carbonate, mica, talc, silica, barium sulfate, calcium sulfate, kaolin, clay, pyroferrite, bentonite, sericite, zeolite, nepheline syenite, attapulgite wollastonite, PMF, ferrite, calcium silicate, magnesium carbonate, antimony trioxide, zinc oxide, titanium oxide, magnesium oxide, iron oxides, molybdenum disulfide, graphite, gypsum, glass beads, powdered glass, glass balloons, quartz; and organic and inorganic pigments.

Further, conventional additives, for example, plasticizers, mold release agents, silane or titanate coupling agents, lubricants, heat stabilizers, weathering agents, nucleating agents, blowing agents, ion-trapping agents, flame-retardants and flame-proofing aids may be incorporated, if desired.

The poly (arylene sulfide) products of the present invention may be blended with one or more of homopolymers and random or block-graft copolymers based on, for example, polyethylene, polybutadiene, polyisoprene, polychloroprene, polystyrene, polybutene, poly α-methylstyrene, polyvinyl acetate, polyvinyl chloride, poly acrylates, polymethyacrylates, polyacrylonitrile, polyamides (e.g., nylon 6, nylon 66, nylon 610, nylon 12, nylon 46), polyesters (e.g., polyethylene terephthalate, polybutylene terephthalate, polyarylate), polyurethanes, polyacetals, polycarbonates, polyphenylene oxide, polysulfones, polyethersulfones, polyaryl sulfones, polyether ketones, polyether ether ketones, polyimides, polyamide imides, silicone resins, phenoxy resins and fluorine resins.

The invention will be illustrated in more detail with reference to the following examples which are presented only for illustrative purposes but not for restriction of the invention thereto.

In the examples, the melt viscosities of the product polyarylene sulfides were measured in a KOHKA type flow tester (with a die having a diameter of 0.5 mm and a length of 2 mm) at 300° C. using a load of 10 kg.

A sample of each of the product polyarylene sulfides was mixed with 40% by weight of glass fibers and injectionmolded. The flexural strength of the molded specimen was measured in accordance with ASTM D790.

EXAMPLE 1

A reactor vessel provided with a stirrer, a dehydration column and a temperature controlling jacket was charged with 110 l of N-methyl pyrrolidone and 60.1 kg of sodium sulfide (59.9 wt % pure) (461 moles) and heated, with stirring, by means of the jacket so as to separate water from the contents through the dehydration column until an internal temperature of 200° C. was achieved. By this dehydration, a distillate comprised essentially of water (14.0 l) was removed.

Then, 69.3 kg (471 moles) p-dichlorobenzene (referred to as "P-DCB") and 48 l of N-methyl pyrrolidone were added to the reaction vessel and the mixture was allowed to react, with stirring, at 250° C. for one hour. The system was cooled down to 100° C. The proportion of unreacted P-DCB remaining in the resulting product slurry was determined by gas chromatography. The conversion of P-DCB was calculated to be 94 molar %.

Into the above reaction system, 776 g (4.7 moles) of 2,4-dichlorophenol and 12 l of N-methyl pyrrolidone were added, and the mixture was allowed to react at 250° C. for a further period of 2 hours.

After completion of the reaction, the reaction mixture liquor was transferred to a solvent recovery unit provided with a stirrer, a jacket and a vacuum line, where the mixture was stirred and heated under vacuum to give a distillate comprising essentially of N-methyl pyrrolidone.

The solvent-deplete mixture was, then, mixed with 200 l of water to give an aqueous slurry, which was stirred and heated at 80° C. and passed to a centrifugal separator to recover a polymeric product. The polymer was washed with hot water at 175° C. The mixture was cooled and passed again to a centrifugal separator.

The centrifugally separated polymer was dried under a stream of air in a jacketed drying oven.

A sample was taken from the dried polymer. The sample was found to have a melt viscosity of 7 Pa.s.

The dried polymer was placed under an atmosphere of 260° C. and subjected to thermal oxidation crosslinking (or curing) for 5 hours. The thus cured polymer had a melt viscosity of 370 Pa.s.

A sample of the polymeric product was mixed with glass fibers and injection-molded. The molded product had a flexural strength of 250 MPa.

EXAMPLE 2

The procedure of Example 1 was repeated except that after the first stage reaction of P-DCB was conducted at 250° C. for 2 hours, the 2,4-dichlorophenol was introduced and the second stage reaction was allowed to proceed at 250° C. for a further one hour and that the curing treatment of the recovered polymer was carried out for 3 hours.

The results are shown in Table 1.

EXAMPLE 3

The procedure of Example 1 was repeated except that after the first stage reaction of P-DCB was conducted at 250° C. for 5 minutes, the 2,4-dichlorophenol was introduced and the second stage reaction was allowed to proceed at 250° C. for a further 3 hours and that the curing treatment was carried out for 6 hours.

The results are shown in Table 1.

COMPARATIVE EXAMPLE 1

The procedure of Example 1 was repeated except that the first stage reaction was conducted at 250° C. for 3 hours, but the addition of 2,4-dichlorophenol and hence the second stage reaction was omitted and that the curing treatment was carried out for 20 hours.

The results are shown in Table 1.

EXAMPLE 4

The procedure of Example 2 was repeated except that the 2,4-dichlorophenol was employed in an amount of 540 g (3.3 moles).

The results are shown in Table 1.

COMPARATIVE EXAMPLE 2

In the procedure of Example 4, 540 g of 2,4-dichlorophenol (3.3 moles) was introduced simultaneously with the p-dichlorobenzene in the earlier part of the procedure and the reaction was conducted at 250° C. for 3 hours and that the curing treatment was carried out for 10 hours.

The results are shown in Table 1.

TABLE 1

| Examples | 1 | 2 | 3 | 4 | Comp. 1 | Comp. 2 |
|---|---|---|---|---|---|---|
| Conditions before addition of 2,4-DCP | | | | | | |
| Na₂S (moles) | 461 | 461 | 461 | 461 | 461 | 461 |
| p-DCB (moles) | 471 | 471 | 471 | 471 | 471 | 471 |
| NMP (liters) | 158 | 158 | 158 | 158 | 158 | 158 |
| Temp. (°C.) reached after dehydration | 200 | 200 | 200 | 200 | 200 | 200 |
| Reaction temp. (°C.) | 250 | 250 | 250 | 250 | 250 | — |
| Reaction time (mins.) | 60 | 120 | 5 | 120 | 180 | — |
| Conversion (%) | 94 | 98 | 76 | 98 | — | — |
| 2,4-DCP (moles) | 4.7 | 4.7 | 4.7 | 3.3 | — | 3.3 |
| Conditions after addition of 2,4-DCP | | | | | | |
| Reaction temp. (°C.) | 250 | 250 | 250 | 250 | — | 250 |
| Reaction time (hrs.) | 2 | 1 | 3 | 1 | — | 3 |
| Dried polymer | | | | | | |
| Melt viscosity (Pa.s.) | 7 | 7 | 8 | 7 | 6 | 6 |
| Curing conditions | | | | | | |
| Temp. (°C.) | 260 | 260 | 260 | 260 | 260 | 260 |
| Time (hrs.) | 5 | 3 | 6 | 3 | 20 | 10 |
| Cured polymer | | | | | | |
| Melt viscosity (Pa.s.) | 370 | 250 | 270 | 200 | 150 | 180 |
| Molded specimen | | | | | | |
| Flexural strength (MPa) | 250 | 265 | 240 | 260 | 215 | 220 |

2,4-DCP: 2,4-dichlorophenol
p-DCB: p-dichlorobenzene
NMP: N—methyl pyrrolidone

EXAMPLE 5

The general procedure of Example 2 was repeated using 456 g (2.4 moles) of 2,4,6-trichlorophenol in place of the 2,4-dichlorophenol. When the 2,4,6-trichlorophenol was added, the conversion of P-DCB had been 98%.

The dried polymer had a melt viscosity of 10 Pa.s. before the curing treatment. The melt viscosity was increased to a level of 410 Pa.s. by the curing treatment.

The molded specimen had a flexural strength of 245 MPa.

From the foregoing, it is apparent that the present invention permits a polyarylene sulfide to be enhanced in its curing ability and enables a desired high level of melt viscosity to be achieved in a significantly reduced period of curing treatment. Further, according to the invention, the polymeric materials may be molded into articles of increased mechanical strengths.

What is claimed is:

1. A process for producing a poly (arylene sulfide) comprising reacting a dihaloaromatic compound with an alkali metal sulfide in a polar organic solvent, wherein when a conversion of at least 60 mole % of the dihaloaromatic compound has been achieved in the reaction system a hydroxyl group-containing polyhaloaromatic compound is added to the reaction mixture in a proportion of from 0.05 to 10 mole % with respect to the alkali metal sulfide and the reaction is allowed to further continue.

2. A process according to claim 1 wherein the dihaloaromatic compound is selected from the group consisting of o-, m- and p-dichlorobenzenes, p-dibromobenzene, p-diiodobenzene, dichloro- and dibromonaphthalenes, dichlorodiphenyl sulfone, dichlorobenzophenone, dichlorodiphenyl ether, dichlorodiphenyl sulfide, dichlorodiphenyl, dibromodiphenyl, and dichlorodiphenyl sulfoxide and mixtures thereof.

3. A process according to claim 2, wherein the dihaloaromatic compound is p-dichlorobenzene.

4. A process according to claim 1, wherein the alkali metal sulfide is selected from the group consisting of sulfides of lithium, sodium, potassium, rubidium and cesium and mixtures thereof.

5. A process according to claim 4, wherein the alkali metal sulfide is sodium sulfide.

6. A process according to claim 4, wherein the alkali metal sulfide is prepared in situ by reacting an alkali metal hydrosulfide with an alkali metal base or by reacting hydrogen sulfide with an alkali metal base prior to introduction of the dihaloaromatic compound and the hydroxyl group-containing polyhaloaromatic compound into the reaction system.

7. A process according to claim 1, wherein the dihaloaromatic compound and the alkali metal sulfide are employed in a ratio of 0.85–1.1 moles of the dihaloaromatic compound per each mole of the alkali metal sulfide.

8. A process according to claim 1, wherein the solvent comprises an aprotic, heat stable organic polar solvent.

9. A process according to claim 8, wherein is employed in an amount of 1–10 moles of the solvent per each mole of the alkali metal sulfide.

10. A process according to claim 1, wherein the hydroxyl group-containing polyhaloaromatic compound is selected from the group consisting of 2,3-, 2,4-, 2,5-, 2,6-, 3,4- and 3,5-dichlorophenols; 2,4,5-, 2,4,6- and 3,4,5-trichlorophenols; 2,4,6-tribromophenol; 1,3-dihydroxy-3,6dichlorobenzene; 2,4-dichloro-1-naphthol; and 2,4-dichloro6-methyl naphthol; and mixtures thereof.

11. A process according to claim 1, wherein the hydroxyl group-containing compound is employed in an amount of 0.1–5 mole % with respect to the alkali metal sulfide.

12. A process according to claim 1, wherein the reaction is conducted at a temperature in the range of 180° to 300° C. for a period of from 0.5 to 20 hours.

13. A process according to claim 12, wherein the reaction temperature is in the range of 200° to 270° C.

14. A poly (arylene sulfide) resin produced by the process according to claim 1.

15. A poly (arylene sulfide) resin according to claim 14 which is thermally treated to achieve an appropriately increased level of melt viscosity suitable for use in molding and coating applications.

16. A process according to claim 1, wherein the polymer is further subjected to thermal treatment so as to achieve an appropriately increased level of melt viscosity suitable for use in molding and coating applications.

* * * * *

UNITED STATES PATENT AND TRADEMARK OFFICE
CERTIFICATE OF CORRECTION

PATENT NO. : 4,868,275

DATED : September 19, 1989

INVENTOR(S) : Toshikazu Kato, Hiroshi Inoue, Satoshi Tomagou and Noriaki Emura

It is certified that error appears in the above-identified patent and that said Letters Patent is hereby corrected as shown below:

Title page:

In item [73], Assignee, please add --TOSO SUSTEEL CO., LTD.--.

Signed and Sealed this

Second Day of October, 1990

*Attest:*

HARRY F. MANBECK, JR.

*Attesting Officer*  *Commissioner of Patents and Trademarks*